3,443,836
MATERIAL HANDLING DEVICE FOR BACK-FILLING COMPRISING PERPENDICULAR CONVEYORS

Illarion Semenovich Poltavtsev, Zoologicheskaya ul., 4–a, kv. 72, Kiev, U.S.S.R; Anatoly Grigorievich Smiryagin, Prospekt Mira, 120, kv. 239, Moscow, U.S.S.R.; Viktor Vasilievich Protsenko, Novo-Okruzhnaya ul., 38, kv. 81; Vasily Eliseevich Shvedov, Zoologicheskaya ul., 4–a, kv. 79; Ljubov Martynova Zgurskaya, ul. Scherbakova, 57 "B," kv. 37; Igor Fedorovich Lyakhovich, ul. Ryleeva, 6, kv. I; Efim Izrailevich Rutberg, ul. Artema, 29, kv. 5; and Nikolai Alexandrovich Borovik, ul. Ivanovskaya, 6, kv. 2, all of Kiev, U.S.S.R.
Filed Feb. 13, 1967, Ser. No. 615,604
Int. Cl. E02f 5/06; B65g 65/06
U.S. Cl. 299—36            2 Claims

ABSTRACT OF THE DISCLOSURE

An operating element of a machine for backfilling trenches comprising two continuous chains, mounted on a frame and disposed in mutually perpendicular planes in such a manner that one of them travels within the closed contour of the other one. The horizontal chain is provided with special rippers, and the vertical one with scrapers. The first chain is used for loosening soil, and the second for conveying soil to the trench. The operating element is mounted on a vehicle and the chains are driven through a reduction gear, mounted on the operating frame, from the power take-off shaft of a vehicle.

---

The present invention relates to earth-moving mechanisms, more particularly to machines for backfilling trenches.

The known machines for backfilling trenches have a vertically-rotating conveyor mounted on the frame of the operating element, the scrapers of said conveyor moving the ground from the heap into the trench.

A disadvantage of the known operating elements of the machines for backfilling trenches lies in that they can work continuously only in loose and friable soils.

The object of the present invention is to develop an operating element capable of working in any type of soil, e.g. in compacted, frozen and stony soil, the machine continuously moving along the trench.

This and other objects are achieved by providing an operating element of a machine for backfilling trenches, whose frame mounts a vertically-rotating conveyor with scrapers moving the soil from the heap into the trench, said frame being capable of turning in horizontal and vertical planes. According to the invention, said frame mounts a horizontally rotating conveyor with soil rippers protruding beyond the scrapers of the vertically-rotating conveyor.

It is expedient that the horizontally-rotating conveyor be at least partly arranged inside the vertically-rotating conveyor.

Other objects and advantages of the invention will now be described by way of example with reference to the accompanying drawings in which.

Figure 1:
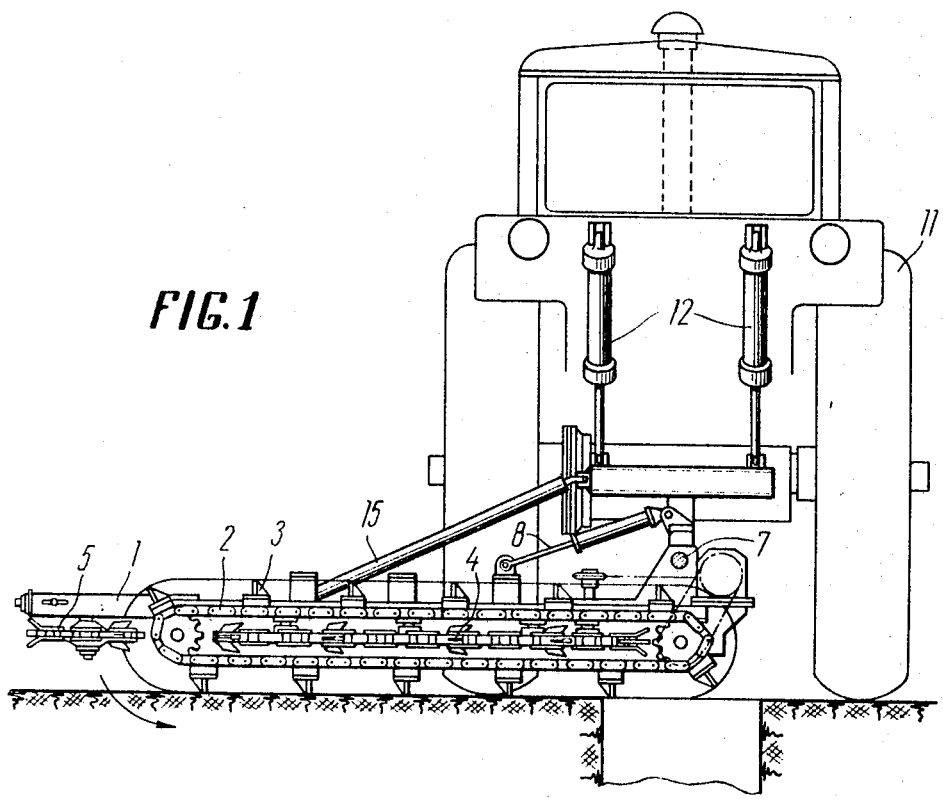
FIG. 1 illustrates an end view of the operating element, according to the invention.
Figure 2:
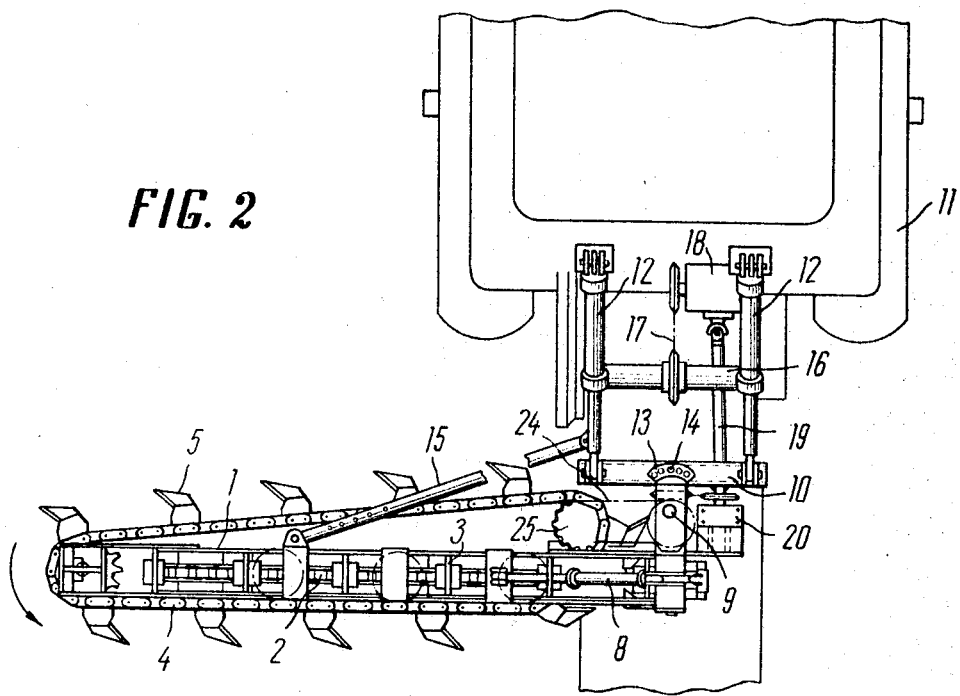
FIG. 2 is a top view thereof.
Figure 3:
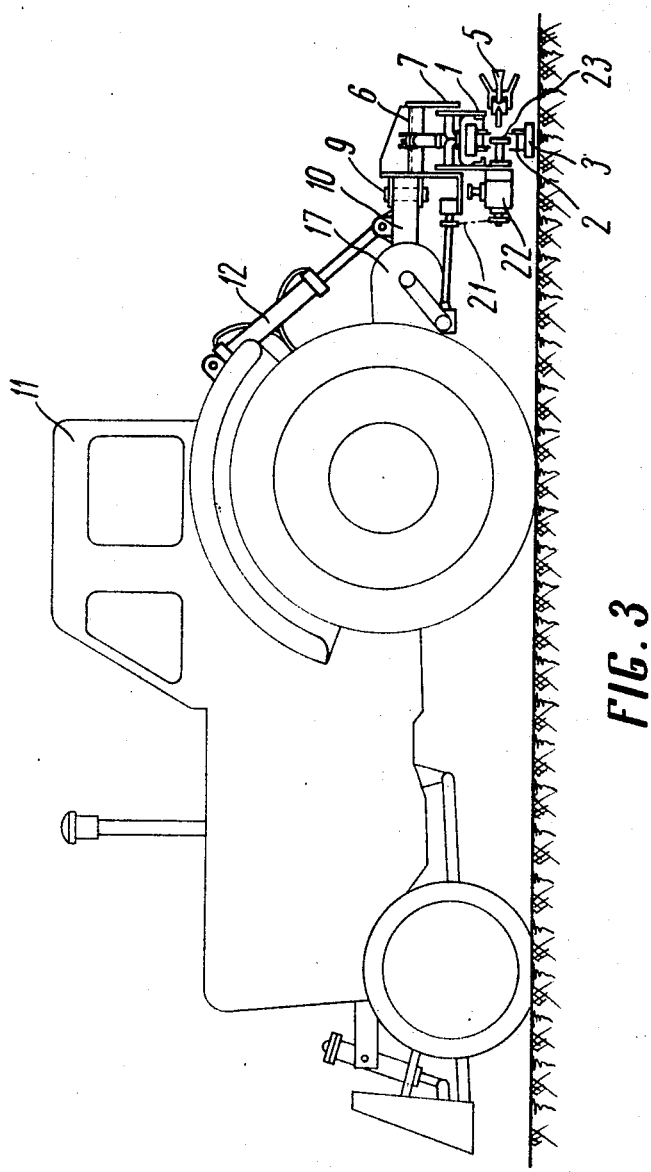
FIG. 3 is a side view thereof.

The operating element has a frame 1 (FIGS. 1, 2) which supports a vertically-rotating chain conveyor 2 with scrapers 3 mounted thereon and a horizontally-rotating chain conveyor 4 with soil rippers 5, said frame 1 being hinged to a turntable bracket 6 by means of a pivot 7 (FIG. 3) and a hydraulic cylinder 8 which turns the frame 1 in the vertical plane. The turnable bracket 6 is connected by a pivot 9 to a turnable frame 10 hinged to a tractor 11. The turnable frame 10 is additionally connected to the tractor 11 by hydraulic cylinders 12.

The frame 1 together with the turnable bracket 6 can be locked by a pin 14 in any horizontal position on a sector 13 located on the turnable frame 10.

An adjustable link 15 insures a more reliable fastening of the frame 1 of the operating element to the tractor 11.

Figure 4:
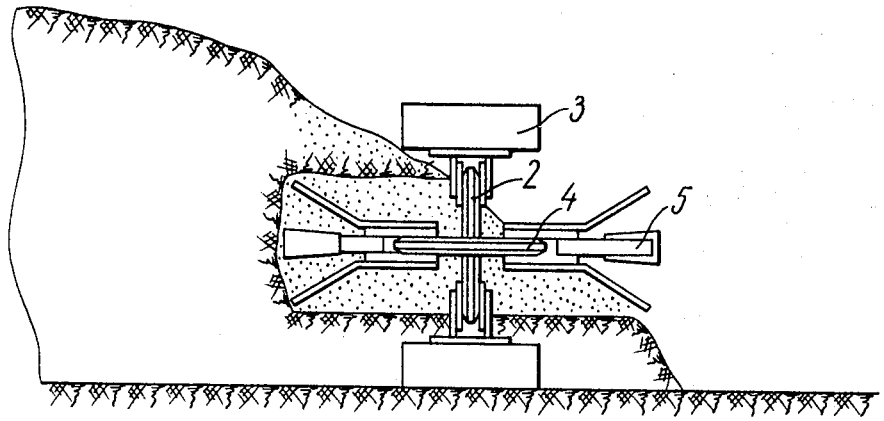
FIG. 4 shows the arrangement of the soil rippers with respect to the scrapers, according to the invention.

The soil rippers 5 (FIG. 4) are fixed on the horizontally-rotating conveyor 4 so as to protrude beyond the scrapers 3 of the vertically-rotating conveyer 2 in order to undercut, loosen and partly convey the soil into the trench before the scrapers of the vertically-rotating conveyer start to convey the soil.

Due to such an arrangement of the soil rippers of the horizontally-rotating conveyer, they absorb the larger part of the frontal pressure of the soil, thus making for a continuous movement of the machine along the trench and improving its efficiency.

Figure 5:
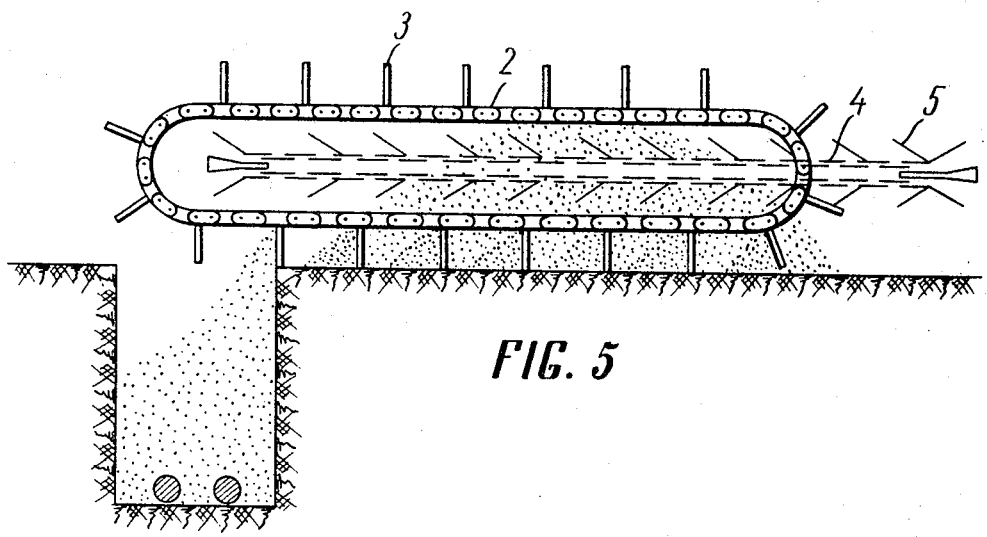
FIG. 5 shows the arrangement of the conveyors, according to the invention.

The horizontally-rotating conveyer 4 (FIG. 5) is partly mounted inside the vertically-rotating conveyer 2. With such an arrangement the vertically-rotating conveyer is protected against frontal loads developed when undercutting and loosening compacted or frozen soil.

Another version of the conveyor arrangement is also possible, in which one conveyer is mounted inside the other. However, with this arrangement the vertically-rotating conveyer is not fully protected against the frontal loads.

An operating element of a machine for backfilling trenches functions as follows.

The tractor 11 carrying the operating element is positioned along the heap above the trench to be backfilled. The hydraulic cylinders 12 lower the operating element. The hydraulic cylinder 8 sets the frame 1 at a certain angle to the heap to allow gradual backfilling by consecutive layers of soil.

Then the vertically-rotating conveyor 2 and the horizontally-rotating conveyor 4 are set in operation.

Rotation is transmitted from a reduction gear 16 (FIG. 2) of the tractor 11 via a chain drive 17, reduction gear 18, universal-joint shaft 19, intermediate reduction gear 20 and chain drive 21 to a reduction gear 22 which, in turn, rotates a driving sprocket 23 of the vertically-rotating conveyor 2. From the reduction gear 22 rotation is transmitted by a chain drive 24 to a drive sprocket 25 of the horizontally-rotating conveyor 4, after which the conveyors start moving the soil from the heap into the trench.

If the soil happens to be heavily compacted or frozen, the frame 1 together with the conveyors 2 and 4 mounted thereon is turned in the horizontal plane through a certain angle by means of the sector 13 and is locked in the new position by the pin 14.

The operating element can be shifted into the transport position by means of the hydraulic cylinder 8 and hydraulic cylinders 12.

In describing the present embodiment of the invention specific narrow terminology has been used for the sake of clarity. However, the invention is not confined to the narrow sense of the terms used and it will be understood that each of said terms embraces all the equivalent elements functioning similarly and employed for solving similar problems.

While a specific embodiment of the invention has been disclosed in the description, it will be understood that various modifications and alterations may be resorted to without departing from the spirit and scope of the invention, as those skilled in the art will easily understand.

Such alterations and modifications are to be considered as falling within the essence and scope of the invention as hereinafter defined by the appended claims.

We claim:

1. An operating element of a machine for backfilling trenches comprising: a frame, means for turning said frame in vertical and horizontal planes; a vertically-rotating conveyor mounted on said frame; scrapers fastened to said conveyor; a horizontally-rotating conveyor also mounted on said frame and located, at least partly, inside the vertically-rotating conveyor; soil rippers fastened to the horizontally-rotating conveyor so as to protrude beyond the scrapers of the vertically-rotating conveyor; and a drive for actuating said conveyors when backfilling trenches.

2. An element as claimed in claim 1, wherein said vertically rotating conveyor has upper and lower lengths of travel and said horizontal rotating conveyor is disposed in entirety, between said upper and lower lengths.

References Cited

UNITED STATES PATENTS

| | | | |
|---|---|---|---|
| 1,023,156 | 4/1912 | Kosmin | 37—90 |
| 1,570,829 | 1/1926 | Forsyth | 299—75 X |
| 2,223,608 | 12/1940 | George | 37—190 |

ERNEST R. PURSER, *Primary Examiner.*

U.S. Cl. X.R.

37—90; 198—12